Jan. 18, 1949.    L. W. BUCHANAN    2,459,615
DUAL-VOLTAGE, SINGLE-PHASE MOTOR
Filed Nov. 21, 1946
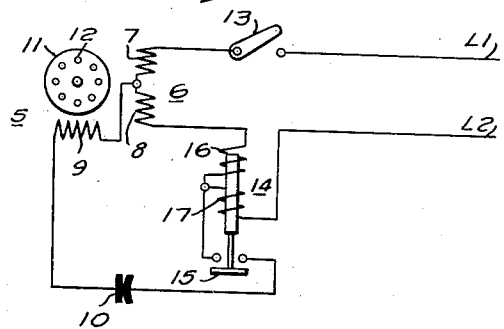
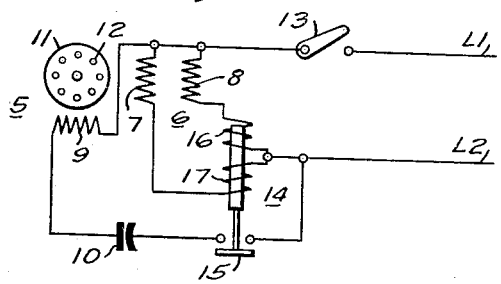
WITNESSES:
INVENTOR
Lloyd W. Buchanan.
BY
ATTORNEY Patented Jan. 18, 1949

2,459,615

UNITED STATES PATENT OFFICE 2,459,615

DUAL-VOLTAGE SINGLE-PHASE MOTOR

Lloyd W. Buchanan, Lima, Ohio, assignor to Westinghouse Electric Corporation, East Pittsburgh, Pa., a corporation of Pennsylvania Application November 21, 1946, Serial No. 711,285

8 Claims. (Cl. 318—225)

The present invention relates to single-phase induction motors, and more particularly to a dual-voltage, single-phase motor, that is, a motor which is adapted for operation on either one of two different voltages.

Single-phase induction motors have a main, or running, primary winding an an auxiliary, or starting, primary winding, which are physically displaced from each other on the stator of the motor, and which carry currents which are displaced in phase, the phase displacement being usually produced either by means of a capacitor in series with the auxiliary winding, or by the design of the windings. In starting such a motor, the auxiliary winding is connected in parallel with the main winding, so that a starting torque is developed, and the auxiliary winding is subsequently disconnected when the motor has accelerated to a sufficiently high speed. Centrifugal switches are frequently used for controlling the circuit of the auxiliary winding, but there are certain applications of single-phase motors where centrifugal switches cannot be used, such as for driving deep-well pumps, or in hermetically sealed refrigerator units. In such cases, current relays are usually used to control the auxiliary winding circuit. In the usual arrangement, the relay contacts are connected in series with the auxiliary winding, and the relay coil is connected in series with the main winding, the relay being adjusted to pick up and close its contacts in response to the main winding locked-rotor current, and to drop out, to disconnect the auxiliary winding, when the current has decreased to a value corresponding to a predetermined speed.

When it is attempted to utilize a current relay in this manner with a dual-voltage motor, however, certain difficulties are encountered. Dual-voltage motors have a main primary winding which is divided into two similar sections, each section of the winding usually being wound in all the poles of the motor. The two sections of the main winding are connected in parallel for operation on a low voltage, such as 115 volts, and in series for operation on a higher voltage, such as 230 volts. In one known arrangement of such motors, the auxiliary winding is connected, during starting, in parallel with the two sections of the main winding for low-voltage operation, and in parallel with one section only of the main winding for high-voltage operation, so that the voltage on the auxiliary winding is the same in both cases, and, in the case of a capacitor-start motor, the same capacitor can be used for both high and low voltage operation.

In applying a current relay to control the auxiliary winding circuit of such a motor, the conventional arrangement described above cannot satisfactorily be used, because of the difference in the main winding currents in the high and low voltage connections, and also because the currents are different, during starting, in the two sections of the main winding in the high-voltage connection. Thus, if the relay coil is connected in series with the main winding, as in the conventional arrangement, the relay setting must be made low enough so that the relay will pick up and close its contacts on the main winding locked-rotor current in the high-voltage connection, which is approximately one-half of the main winding locked-rotor current in the low-voltage connection. If the relay setting is determined in this way, however, the drop-out current of the relay is so low that it will not drop out, if the relay coil is connected so that it carries the current of the winding section which is not paralleled by the auxiliary winding. If the relay coil is connected so that it carries the same current as the main winding section which is paralleled by the auxiliary winding, in the high-voltage connection, the relay will drop out at the desired point, but the current through the relay coil will increase sufficiently, as soon as the auxiliary winding is disconnected, to cause the relay to immediately pick up again. Thus, in order to use a current relay in the conventional manner with a dual-voltage motor, different relays, or at least different relay settings, must be used for the two different voltages, which is very undesirable, or even impractical.

The principal object of the present invention is to provide a dual voltage, single-phase, induction motor utilizing a current relay to control the auxiliary winding, in which the same relay, with the same setting, can be used for both high and low voltage operation, so that the motor can easily be changed from one voltage to another merely by changing the winding connections.

Another object of the invention is to provide a dual-voltage, single-phase induction motor utilizing a current relay for controlling the auxiliary winding circuit, in which the same relay can be used for both high and low voltage operation, and in which the relay operation is much less sensitive to line voltage variations than in previously-known arrangements, so that satisfactory operation is obtained over a considerable range of line voltages.

More specifically, the present invention provides a dual voltage, single-phase, induction motor having a current relay for controlling the circuit of the auxiliary primary winding, in which the operating coil of the relay is divided into two sections, and in which each section of the relay coil is connected in series with one of the two sections of the main primary winding. With this arrangement, the effect of the currents in the two sections of the relay coil can be made substantially the same for both high and low voltage operation, and the same relay, with the same setting, can be used for both voltages.

The invention will be more fully understood from the following detailed description, taken in connection with the accompanying drawing, in which;

Figure 1 is a schematic wiring diagram of a single-phase induction motor embodying the invention and connected for high-voltage operation; and Fig. 2 is a similar diagram showing the motor connected for low-voltage operation.

The motor 5 shown in the drawing is a single-phase, dual voltage motor, of the capacitor-start type, although the invention is not necessarily restricted to this particular type of single-phase motor. The motor 5 has a main primary winding 6, which comprises two similar sections 7 and 8, each of the main winding sections preferably being wound in all the poles of the motor, in the usual manner. The motor also has an auxiliary, or starting, primary winding 9, which is physically displaced for the main winding 6 on the stator of the motor, as diagrammatically indicated in the drawing. A capacitor 10 is connected in series with the auxiliary winding 9 to produce a phase displacement between the main and auxiliary winding currents. The motor 5 also has a rotor member 11 which carries a squirrel-cage winding 12, or other suitable secondary winding.

The main winding 6 of the motor 5 is connected directly across a single-phase supply line L1, L2 by means of a line switch 13. The auxiliary winding 9 is controlled by a current relay 14, which has a contact 15 connected in series with the auxiliary winding 9. The relay 14 has an operating coil which is divided into two sections 16 and 17. The contact 15 of the relay 14 is normally open, and the relay is designed to pick up and close the contact 15 to connect the auxiliary winding 9 to the line when the combined effect of the currents in the two coil sections 16 and 17 is equivalent to that of a predetermined effective current, and to drop out and disconnect the auxiliary winding when the currents in the coil sections have decreased to a lower effective value corresponding to a predetermined speed of the motor.

In the high-voltage connection of the motor, shown in Fig. 1, the two sections 7 and 8 of the main primary winding 6 are connected in series across the line L1, L2. The auxiliary winding 9 is connected across the main winding section 8 alone, when the relay 14 closes its contact 15, so that the main winding 6, in effect, acts as an autotransformer and applies approximately half the line voltage across the auxiliary winding circuit. Thus, the same voltage is applied to the auxiliary winding 9 and capacitor 10 as in the low-voltage connection, and the same capacitor can be utilized for either high or low voltage operation. In the high-voltage connection of Fig. 1, the section 16 of the relay coil is connected in series with the section 8 of the main winding 6, so as to carry the same current as this winding section, which is paralleled by the auxiliary winding 9 during starting. The other section 17 of the relay coil is connected in series with the main winding 6 outside of the paralleling connection of the auxiliary winding 9, so that the coil section 17 carries the same current as the main winding section 7. Thus, in effect, each section of the relay coil is in series with one section of the main winding 6, and carries the same current as one section of the main winding.

In the low-voltage connections of the motor, shown in Fig. 2, the two sections 7 and 8 of the main winding are connected in parallel to the line L1, L2, and the auxiliary winding 9 is connected to the line in parallel with the two sections of the main winding. In this connection of the motor, the coil section 16 of the relay 14 is connected in series with the main winding section 8, and the section 17 of the relay coil is connected directly in series with the main winding section 7, so that again each section of the relay coil is connected in series with one section of the main winding. In this connection, of course, the two main winding sections 7 and 8 carry substantially equal currents, and both sections 16 and 17 of the relay coil might be connected in series with either section of the main winding, although it is preferred to connect them as shown.

In operation, on either voltage, the motor is started by connecting it to the line by means of the line switch 13. The locked-rotor current flowing through the two sections of the coil of the relay 14 causes the relay to pick up and close its contact 15 at a predetermined effective current, which may, for example, be from 70% to 90% of the maximum main winding locked-rotor current, depending on the minimum voltage on which it is desired to start the motor. In the low-voltage connection of Fig. 2, of course, the locked-rotor current divides equally between the two sections of the main winding and the two sections 16 and 17 of the relay coil. In the high-voltage connection of Fig. 1, the locked-rotor current flowing through the two winding sections 7 and 8 in series, and through the relay coil sections 16 and 17, when the relay contact 15 is still open, will be approximately the same as the locked-rotor current in each of the paralleled winding sections in the low voltage connection. Thus, the relay 14 can be set to pick up and connect the auxiliary winding, to start the motor, at the same current in either connection.

As soon as the relay 14 closes its contact 15, in either connection, the motor starts to run, and in the high-voltage connection, the currents in the two main winding sections 7 and 8 become different, because of the fact that the winding section 8 is paralleled by the auxiliary winding 9. Thus, the currents in the two sections 16 and 17 of the relay coil will also be unequal, since these coil sections carry the same currents as the respective main winding sections with which they are in series. If the two coil sections 16 and 17 are equal, however, the effect of the currents in the two coil sections will be the same as though a current equal to one-half of their vector sum flowed through the two coil sections in series. The value of this effective current is very close to one-half the main winding current in the low-voltage connection, which is the current that flows through each of the paralleled main winding sections, and which also flows through each of the relay coil sections, in the low-voltage connection. Thus, in either the high-voltage or low-voltage connection, the effective current in the relay coil is substantially the same, and the relay can be set to drop out at a predetermined effective current, corresponding to a predetermined motor speed, to disconnect the auxiliary winding when the motor has accelerated to that speed.

Thus, the same relay, with the same current setting, can be utilized to control the auxiliary winding circuit on either high-voltage or low-voltage, and the motor can be changed from operation on one voltage to operation on the other merely by changing the connections, without disturbing the relay. This arrangement also has another advantage in that it is much less sensitive to variations in line voltage, in the high-voltage connection, than the conventional arrangement in which a single relay coil is connected in series with the main winding. Thus, tests have shown that a motor connected as shown in Fig. 1 will operate satisfactorily on line voltages ranging from 190 volts to 255 volts, or a voltage range of 65 volts, whereas motors using the conventional arrangement will not usually operate satisfactorily over a voltage range of more than 25 volts.

It will now be apparent that dual-voltage, single-phase motor has been provided utilizing a current relay for controlling the auxiliary winding, in which the same relay with the same setting, can be used for either high or low voltage operation, thus making it possible to readily change the motor from one voltage to the other, merely by changing the connections. It will be understood that various modifications may be made within the scope of the invention. Thus, it is not always necessary for the two sections 16 and 17 of the relay coil to be equal, as their relative proportions can be varied so as to vary the effective current between fairly wide limits, depending on the requirements of a particular application. It will be obvious that various other modifications may be made, and it is to be understood, therefore, that although a specific embodiment of the invention has been shown and described for the purpose of illustration, the invention is not limited to this specific arrangement, but in its broadest aspects it includes all equivalent modifications and embodiments which come within the scope of the appended claims.

I claim as my invention:

1. A single-phase induction motor having a stator member and a rotor member, a main primary winding on said stator member, said main primary winding comprising two similar sections adapted to be connected either in series or in parallel for operation on different voltages, an auxiliary primary winding on the stator member physically displaced from the main primary winding and adapted to be connected in parallel with at least one section of the main primary winding, and a current-responsive relay having a contact connected in series with said auxiliary primary winding, said relay having an operating coil divided into two sections, means for connecting one section of said operating coil to carry the same current as one section of the main primary winding, and means for connecting the other section of the operating coil to carry the same current as the other section of the main primary winding.

2. A single-phase induction motor having a stator member and a rotor member, a main primary winding on said stator member, said main primary winding comprising two similar sections adapted to be connected either in series or in parallel for operation on different voltages, an auxiliary primary winding on the stator member physically displaced from the main primary winding and adapted to be connected in parallel with at least one section of the main primary winding, and a current-responsive relay having a contact connected in series with said auxiliary primary winding, said relay having an operating coil divided into two sections, means for connecting one section of said operating coil in series with one section of the main primary winding, and means for connecting the other section of the operating coil in series with the other section of the main primary winding.

3. A single-phase induction motor having a stator member and a rotor member, a main primary winding on said stator member, said main primary winding comprising two similar sections connected in series, an auxiliary primary winding on the stator member physically displaced from the main primary winding and connected in parallel with one section of the main primary winding, a current-responsive relay for controlling the circuit of said auxiliary primary winding, said relay having a contact connected in series with the auxiliary winding and having an operating coil divided into two sections, means for connecting one section of said operating coil to carry the same current as said one section of the main primary winding, and means for connecting the other section of the operating coil to carry the same current as the other section of the main primary winding.

4. A single-phase induction motor having a stator member and a rotor member, a main primary winding on said stator member, said main primary winding comprising two similar sections connected in series, an auxiliary primary winding on the stator member physically displaced from the main primary winding and connected in parallel with one section of the main primary winding, a current-responsive relay for controlling the circuit of said auxiliary primary winding, said relay having a contact connected in series with the auxiliary winding and having an operating coil divided into two sections, means for connecting one section of said operating coil in series with said one section of the main primary winding, and means for connecting the other section of the operating coil in series with the other section of the main primary winding.

5. A single-phase induction motor having a stator member and a rotor member, a main primary winding on said stator member, said main primary winding comprising two similar sections connected in series, an auxiliary primary winding on the stator member physically displaced from the main primary winding and connected in parallel with one section of the main primary winding, a current-responsive relay for controlling the circuit of said auxiliary primary winding, said relay having a contact connected in series with the auxiliary winding and having an operating coil divided into two sections, means for connecting one section of said operating coil in series with said one section of the main primary winding inside the paralleling connection of the auxiliary winding, and means for connecting the other section of the operating coil in series with the main primary winding outside said paralleling connection.

6. A single-phase induction motor having a stator member and a rotor member, a main primary winding on the stator member, said main primary winding comprising two similar sections, an auxiliary primary winding physically displaced from the main primary winding on the stator member, means for connecting said main winding sections and said auxiliary winding in parallel for operation on a low voltage, means for connecting the main winding sections in series and the auxiliary winding in parallel with one section of the main winding for operation on a higher voltage, and a current-responsive relay having a contact in series with the auxiliary winding, said relay having an operating coil divided into two sections, means for connecting the sections of said operating coil to carry the same currents as the sections of the main winding when the motor windings are connected for low-voltage operation, and means for connecting one section of said operating coil to carry the same current as one section of the main winding and for connecting the other section of the operating coil to carry the same current as the other section of the main winding when the motor windings are connected for high-voltage operation.

7. A single-phase induction motor having a stator member and a rotor member, a main primary winding on the stator member, said main primary winding comprising two similar sections, an auxiliary primary winding physically displaced from the main primary winding on the stator member, means for connecting said main winding sections and said auxiliary winding in parallel for operation on a low voltage, means for connecting the main winding sections in series and the auxiliary winding in parallel with one section of the main winding for operation on a higher voltage, and a current-responsive relay having a contact in series with the auxiliary winding, said relay having an operating coil divided into two sections, means for connecting the sections of said operating coil to carry the same currents as the sections of the main winding when the motor windings are connected for low-voltage operation, and means for connecting one section of said operating coil in series with one section of the main winding and for connecting the other section of the operating coil in series with the other section of the main winding when the motor windings are connected for high-voltage operation.

8. A single-phase inducton motor having a stator member and a rotor member, a main primary winding on the stator member, said main primary winding comprising two similar sections, an auxiliary primary winding physically displaced from the main primary winding on the stator member, means for connecting said main winding sections and said auxiliary winding in parallel for operation on a low voltage, means for connecting the main winding sections in series and the auxiliary winding in parallel with one section of the main winding for operation on a higher voltage, and a current-responsive relay having a contact in series with the auxiliary winding, said relay having an operating coil divided into two sections, means for connecting the sections of said operating coil to carry the same currents as the sections of the main winding when the motor windings are connected for low-voltage operation, and means for connecting one section of said operating coil in series with said one section of the main winding which is in parallel with the auxiliary winding and for connecting the other section of the operating coil in series with the main winding outside the paralleling connection of the auxiliary winding when the motor windings are connected for high-voltage operation.

LLOYD W. BUCHANAN.

REFERENCES CITED

The following references are of record in the file of this patent:

UNITED STATES PATENTS

| Number | Name | Date |
|---|---|---|
| 2,255,437 | Pearce | Sept. 9, 1941 |
| 2,319,490 | Clark | May 18, 1943 |